United States Patent [19]

Lechevalier

[11] Patent Number: 5,797,418

[45] Date of Patent: Aug. 25, 1998

[54] DIFFERENTIAL PRESSURE DETECTOR WITH REDUCED REACTION FORCES

[75] Inventor: Michel Marie André Albert Lechevalier, Bombon, France

[73] Assignee: Societe Nationale d'Etude et de Construction de Moteurs d'Aviation "Snecma", Paris, France

[21] Appl. No.: 578,911

[22] Filed: Dec. 27, 1995

[30] Foreign Application Priority Data

Jan. 11, 1995 [FR] France ................... 95 00239

[51] Int. Cl.$^6$ ........................................ G05D 7/03
[52] U.S. Cl. ............... 137/115.07; 137/487; 137/500; 137/508
[58] Field of Search ................... 137/501, 500, 137/503, 495, 488, 487, 87.04, 87.06, 508, 115.07

[56] References Cited

U.S. PATENT DOCUMENTS

| | | | |
|---|---|---|---|
| 1,050,763 | 1/1913 | Cooper | 137/503 |
| 1,477,244 | 12/1923 | Collins | 137/503 |
| 2,079,915 | 5/1937 | Midyette | 137/503 |
| 2,270,097 | 1/1942 | Weining | 137/87.04 |
| 2,796,879 | 6/1957 | Jacobson | 137/87.04 |
| 2,842,149 | 7/1958 | Donaldson | 137/87.04 |
| 4,589,440 | 5/1986 | Panet | 137/503 |
| 5,433,237 | 7/1995 | Kao | 137/87.04 |

*Primary Examiner*—Stephen M. Hepperle
*Assistant Examiner*—Ramyar Farid
*Attorney, Agent, or Firm*—Oblon, Spivak, McClelland, Maier & Neustadt, P.C.

[57] ABSTRACT

A differential pressure detector for providing an output pressure modulated as a function of the pressure drop between the pressures upstream and downstream of a fuel metering device, comprising first and second input chambers for connection to said upstream and downstream pressures respectively, a modulated pressure output chamber, a sleeve which is linearly movable in response to changes in the difference between the pressures in the first and second input chambers, and a fixed slide valve which is partly received in the sleeve and which has a bore opening into the output chamber and at least one side port for communicating the first input chamber with the output chamber via the slide valve bore, the aperture of the side port being varied by linear movement of the sleeve to control the communication between the first input chamber and the output chamber. The detector has reduced reaction forces and is particularly suitable for use in a fuel flow regulating system.

5 Claims, 2 Drawing Sheets

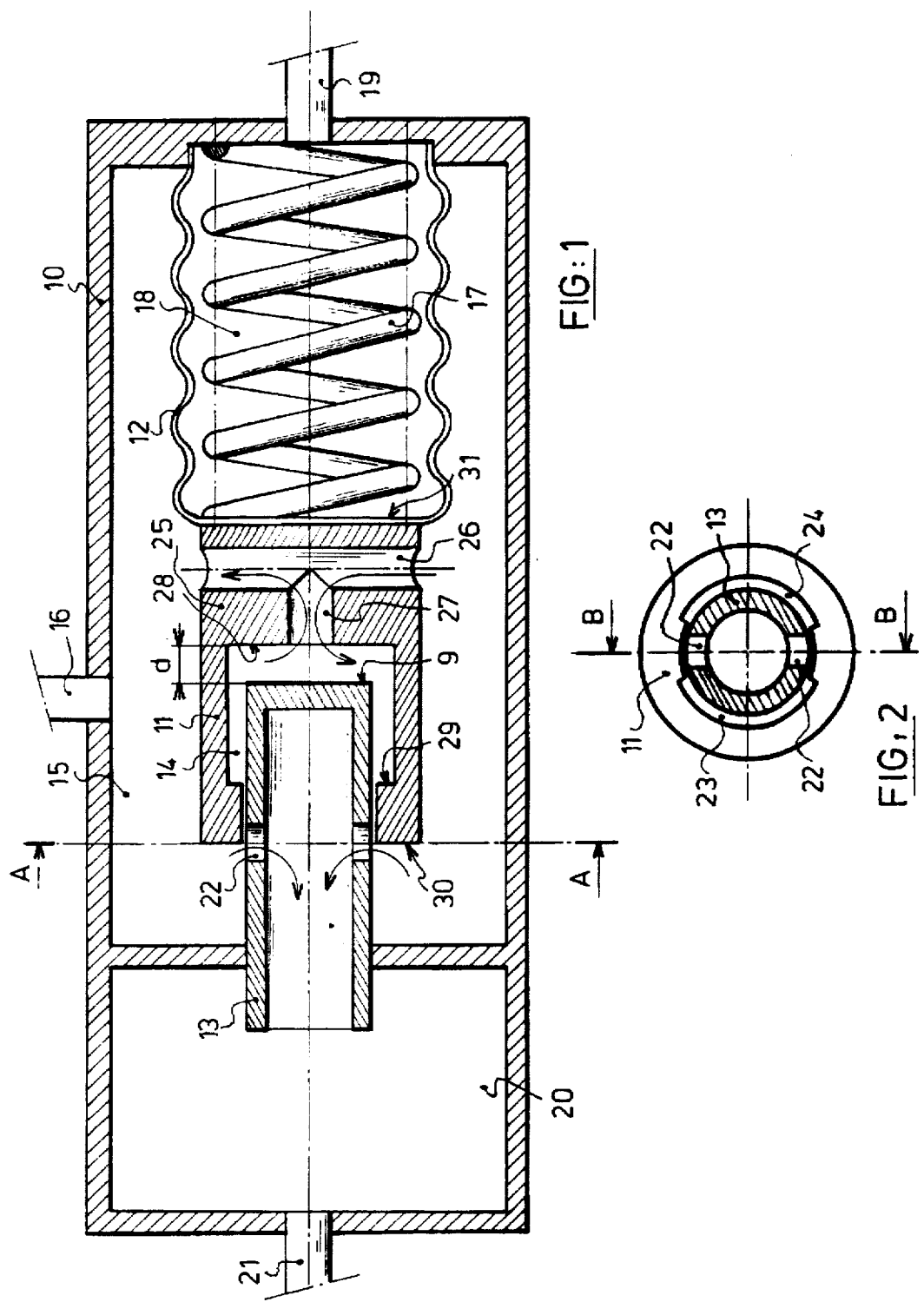

5,797,418

DIFFERENTIAL PRESSURE DETECTOR WITH REDUCED REACTION FORCES

BACKGROUND OF THE INVENTION

1. Field of the Invention

The invention relates to a differential pressure detector with reduced reaction forces, and is particularly applicable to such a detector for use in a fuel flow regulation system for a turbomachine.

Fuel regulators for turbomachines generally comprise a flow metering device which is connected upstream to the output of a displacement pump and downstream to an injection circuit, a by-pass control valve between the pump and the metering device, a pressure drop detector intended to provide an output pressure which is modulated as a function of the difference between the pressures measured upstream and downstream of the metering device, the modulated output pressure acting on the control valve to open or close it in order to maintain the pressure drop across the metering device substantially constant, and a stop valve for stopping on command the flow of fuel injected into the turbomachine, the members of the regulator being controlled by a computer.

2. Summary of the Prior Art

The known pressure drop detectors generally comprise a casing inside which a peg is movable in response to the pressure differential between two enclosures connected respectively to the pressures upstream and downstream of the metering device. The peg faces a nozzle constriction provided with an outlet opening for fluid at a modulated pressure, the value of the modulated pressure being a function of the relative distance between the peg and the outlet opening. However, these pressure drop detectors suffer from the drawback of not being sufficiently precise, as the flow of fluid through the outlet opening generates stray forces which are applied to the movable peg. These stray forces, termed dynamic hydraulic forces, or reaction forces, are in a direction opposite that of the jet of fluid, and are proportional to the difference in the pressures on opposite sides of the outlet opening. Their influence in the regulation loop causes imprecision in the value of the metered fuel flow. In addition, with this type of pressure drop detector there is a risk of damage to the nozzle constriction which may lead to malfunction of the detector and to fuel metering errors.

SUMMARY OF THE INVENTION

It is an object of the invention to provide a pressure drop detector having reduced reaction forces so that, when the detector is used in a fuel regulating system, the effect of these reaction forces on the metering of the fuel is reduced and the precision of the metering is improved.

Accordingly, the invention provides a differential pressure detector having reduced reaction forces for providing an output pressure modulated as a function of the pressure drop between the pressures measured upstream and downstream of a fuel metering device, said detector comprising first and second input chambers for connection respectively to said pressures upstream and downstream of said fuel metering device, a modulated pressure output chamber, a sleeve which is linearly movable in response to changes in the difference between the pressures in said first and second input chambers, and a fixed slide valve which is partly received within said sleeve, said slide valve having a bore opening into said output chamber and at least one side port for communicating said first input chamber with said bore of said slide valve, and hence with said output chamber, the aperture of said side port being varied by said sleeve during linear movement of said sleeve to control the communication between said first input chamber and said output chamber.

Thus, the invention effectively involves replacing the arrangement consisting of a movable peg in front of a nozzle constriction by an arrangement in which a movable sleeve varies the opening and closing of side ports of a slide valve. This arrangement allows the flow of fluid jets perpendicular to the sleeve which generate low reactive forces having little influence on the regulation of the pressure drop across the metering device.

Other features and advantages of the invention will become apparent from the following description of a preferred embodiment, given by way of non-limitative example, with reference to the attached drawings.

BRIEF DESCRIPTION OF THE DRAWINGS

FIG. 1 is a longitudinal section through one embodiment of a differential pressure detector in accordance with the invention, taken on line B—B in FIG. 2;

FIG. 2 is a transverse section through part of the detector taken on line A—A in FIG. 1; and, FIG. 3 is a diagram of a hydromechanical fuel metering circuit including a differential pressure detector in accordance with the invention.

DESCRIPTION OF THE PREFERRED EMBODIMENT

Figure 3:
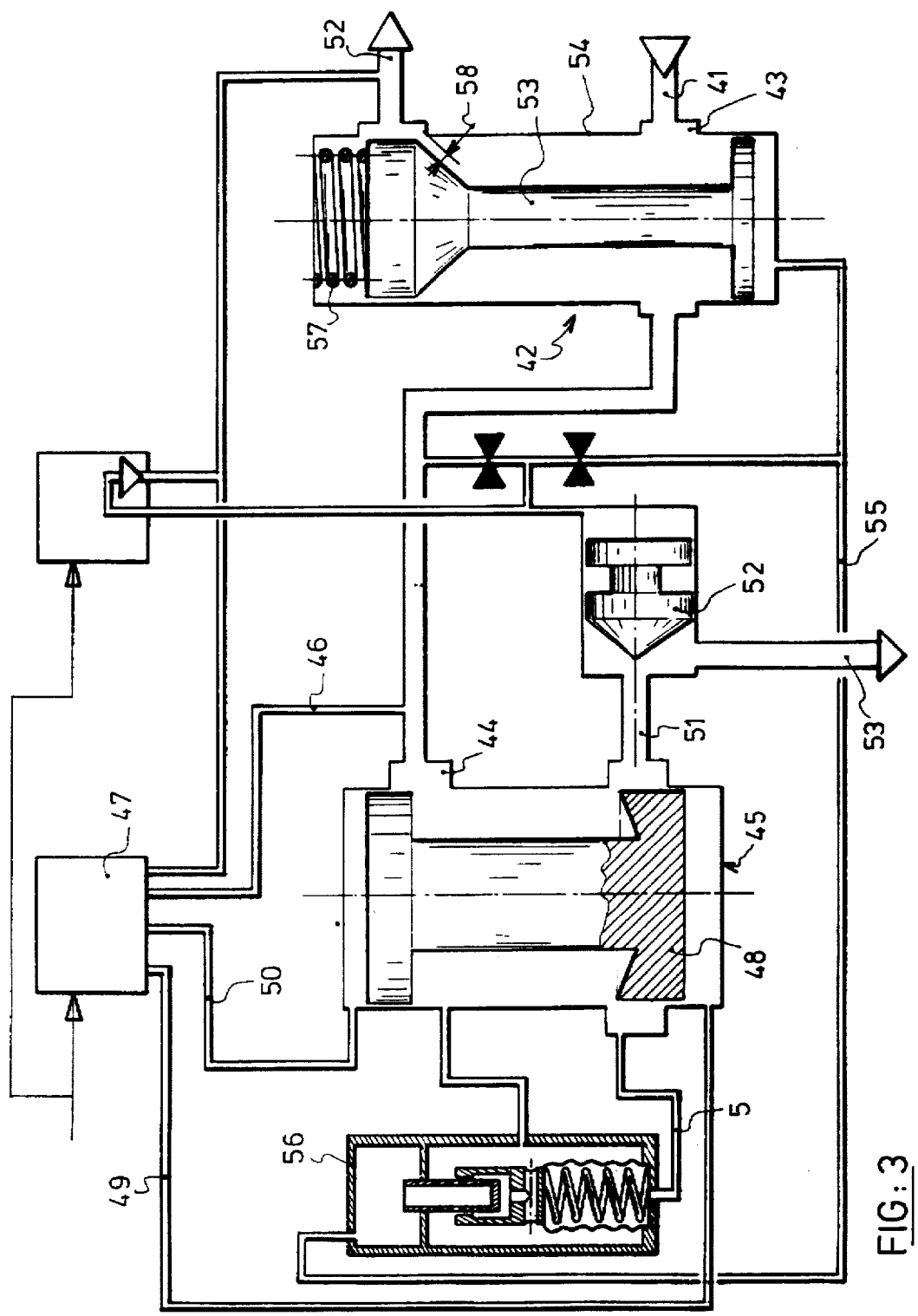

The pressure drop detector shown in FIG. 1 comprises a casing 10 housing a sleeve 11 which is linearly movable and is rigidly connected to a bellows 12, and a fixed slide valve 13 having one end 9 received within a bore of the sleeve 11. Around the slide valve, the sleeve, and the bellows the casing 10 defines a first chamber 15 which, in use, is connected by a duct 16 to the pressure upstream of a metering device (not shown). The interior of the bellows 12 forms a second chamber 18 which, in use, is connected by a duct 19 to the pressure downstream of the fuel metering device, and houses an adjusting spring 17 which acts on the sleeve 11.

The slide valve 13 contains a bore which opens, at its end opposite its closed end 9 received in the sleeve 11, into a third chamber 20 defined by the casing 10 and connected by a duct 21 to a control valve which is not shown. In addition, the slide valve 13 has side ports 22 which are covered or uncovered to varying degrees by the sleeve 11 as the latter is moved linearly, thus controlling the communication of the first chamber 15 with the third chamber 20 via the ports 22 and the bore of the slide valve 13. This control thus modulates the pressure in the chamber 20 so as to provide a modulated output pressure for use in keeping the pressure drop across the metering device substantially to a fixed value.

As the transverse section in FIG. 2 shows, the fitting between the slide valve 13 and the sleeve 11 is not continuous around the slide valve so that the pressure in the first chamber 15 which is equal to the pressure upstream of the metering device, can establish itself, via passages 23, 24 formed between the sleeve and the slide valve, in an enclosure 14 within the sleeve and around the end of the slide valve 13. The end wall 25 of the sleeve 11 connected to the bellows 12 is provided with two passages 26, 27, one longitudinal and one transverse, which communicate with each other and provide a further communication between the enclosure 14 and the chamber 15. These two passages 26, 27 prevent damping of the movement of the sleeve relative to the slide valve, due to the evacuation or admission of fluid through the passages 23 and 24 between the sleeve and the slide valve. The positioning of the slide valve in the sleeve is set so that the distance d between the end 9 of the slide valve and the end wall 25 of the sleeve is very short when the sleeve closes the ports 22 exactly. The value of the distance d corresponding to this closure position is chosen taking into account the elastic limit of the bellows 12 so as to avoid any permanent deformation by extension of the bellows 12.

The sleeve 11 is subject to the action of the force of the spring 17, the force due to the pressure upstream of the metering device acting on its faces 28, 29 30, and the force due to the pressure downstream of the metering device acting on its face 31. When the difference between the pressures upstream and downstream of the metering device changes from a predetermined value, the sleeve moves linearly to increase or decrease the aperture of the ports 22 depending on whether the pressure differential has increased or decreased. Varying the aperture of the ports 22 varies the jets of fluid flow through the ports between the chamber 15 and the chamber 20, which modulates the pressure in the chamber 20 with a view to returning the pressure drop across the metering device to the predetermined value.

As the jets of fluid through the ports 22 are perpendicular to the sleeve 11, they generate low reaction forces much below the forces generated by the pressures upstream and downstream of the metering device. These reaction forces thus have little influence on the control of the pressure drop across the metering device. Moreover, the pressure upstream of the metering device, through the intervention of the anti-damping apertures 26, 27, is exerted over the whole of the cross-sectional area of the sleeve. These two advantages enable fuel to be metered much more precisely than with a detector including a nozzle and peg assembly. In addition, the detector of the invention does not suffer any problems stemming from damage to the nozzle constriction by impacts on the peg, since the detector does not have such a nozzle and peg.

FIG. 3 shows an example of a hydromechanical fuel metering unit including a differential pressure detector in accordance with the invention.

This hydromechanical unit has an inlet duct 41 for the entire flow of fuel delivered at high pressure from a pump which is not shown. This flow by-passes a control valve 42 via a groove 43 and arrives at a groove 44 upstream of a flow metering device 45. A duct 46 directs a portion of this high pressures fuel flow to a servo-valve 47 which controls the position of the piston 48 of the metering device 45 by the action of two modulated pressures 49, 50. The metered fuel flow 51 is directed through a stop valve 52 towards fuel injectors as indicated by arrow 53. The excess fuel flow resulting from the difference between the total flow arriving through the duct 41 and the metered flow 51 is routed by the control valve 42 to a low pressure outflow duct 52. For this purpose, the control valve 42 includes a piston 53 positioned in a sleeve 54 by the action of the low pressure 52, the action of a modulated pressure 55 the value of which is determined by the differential pressure detector 56, and the action of a spring 57. Thus, when the value of the modulated pressure 55 rises, the piston 53 compresses the spring 57 and the section 58 of the passage for the excess flow to the low pressure duct 52 increases. The process is reversed when the value of the modulated pressure 55 drops. The value of the modulated pressure is regulated by the differential pressure detector 56 in the manner described with reference to FIG. 1, the duct 16 of the detector being connected to receive a portion of the high pressure fuel flow upstream of the metering piston 48, the duct 19 being connected to the metered flow 51 downstream of the piston 48, and the duct 21 carrying the modulated pressure 55 from the output chamber 20 to the control valve 42.

I claim:

1. A differential pressure detector having reduced reaction forces for providing to main fuel relief valve an output pressure modulated as a function of the pressure drop between the pressures measured upstream and downstream of a fuel metering device, said detector comprising first and second input chambers for connection respectively to said pressures upstream and downstream of said fuel metering device, a modulated pressure output chamber connected to said main fuel relief valve for supplying said modulated output pressure to said main fuel relief valve for actuating said main fuel relief valve, a sleeve which is linearly movable in response to changes in the difference between the pressures in said first and second input chambers, and a fixed slide valve which is partly received within said sleeve, said slide valve having a bore opening into said output chamber and at least one side port for communicating said first input chamber with said bore of said slide valve, and hence with said output chamber, the aperture of said side port being varied by said sleeve during linear movement of said sleeve to control the communication between said first input chamber and said output chamber.

2. A differential pressure detector according to claim 1, wherein said sleeve defines an enclosure between said sleeve and an end of said slide valve within said sleeve, and a gap is provided between said sleeve and said slide valve so that there is a communication between said first input chamber and said enclosure which allows the pressure in said first input chamber to be established in said enclosure.

3. A differential pressure detector according to claim 2, wherein said sleeve has an end wall provided with interconnected longitudinal and transverse passages forming a further communication between said enclosure and said first input chamber.

4. A differential pressure detector according to claim 3, wherein said sleeve is rigidly connected to a bellows, the interior of said bellows defining said second input chamber, and an adjusting spring is disposed within said bellows so as to act on said sleeve.

5. A differential pressure detector according to claim 4, wherein the positioning of said slide valve within said sleeve is such that when said sleeve just fully closes said at least one side port of said slide valve, the end of said slide valve is spaced from said end wall of said sleeve by a predetermined distance such that the elastic limit of said bellows cannot be exceeded.

* * * * *